United States Patent [19]

Yang

[11] Patent Number: 6,011,237
[45] Date of Patent: Jan. 4, 2000

[54] LOCKING ELECTRODE TIP FOR RESISTANCE SPOT-WELDING

[76] Inventor: Daniel Yang, 4363 San Juan Ave., Fremont, Calif. 94536

[21] Appl. No.: 09/335,220

[22] Filed: Jun. 17, 1999

[51] Int. Cl.[7] .................................................. B23K 11/30
[52] U.S. Cl. ........................................ 219/119; 219/120
[58] Field of Search .................... 219/119, 118, 219/120

[56] References Cited

U.S. PATENT DOCUMENTS

| | | | |
|---|---|---|---|
| 2,431,334 | 5/1947 | Lambert | 219/4 |
| 3,665,145 | 5/1972 | Engel | 219/119 |
| 4,044,220 | 8/1977 | Glagola | 219/119 |
| 4,288,024 | 9/1981 | Nippert | 219/119 |
| 4,514,612 | 4/1985 | Nied | 219/119 |
| 4,728,765 | 3/1988 | Prucher | 219/120 |
| 4,733,052 | 3/1988 | Nilsson | 219/137.61 |
| 4,843,206 | 6/1989 | Azuma | 219/119 |
| 4,861,961 | 8/1989 | Huys | 219/119 |
| 5,066,845 | 11/1991 | Anderson | 219/119 |
| 5,345,136 | 9/1994 | Nippert | 219/120 |
| 5,611,945 | 3/1997 | Kuwabara | 219/119 |
| 5,726,420 | 3/1998 | Lajoie | 219/137.61 |

*Primary Examiner*—Patrick Ryan
*Assistant Examiner*—Anjan Dey

[57] ABSTRACT

A resistance welding electrode body is fitted with a metal pin which serves as an anchor point for an electrode welding tip. The electrode welding tip contains two lead-in notches and diagonal grooves that allow the electrode tip to be locked onto the electrode body. This form of electrode has been found advantageous in terms of retaining the electrode tip onto the electrode body during resistance spot welding.

3 Claims, 2 Drawing Sheets

LOCKING ELECTRODE TIP FOR RESISTANCE SPOT-WELDING

BACKGROUND

1. Field of Invention

The present invention relates to electrodes used in resistance welding. The electrode tip has grooves that lock onto a metal pin which has been inserted in the electrode. The locking mechanism prevents workpiece metal from sticking to the tip; causing the tip to dislodge from the electrode. The locking mechanism eliminates the need for continuous reattachment of the electrode tip to the electrode and thereby facilitates production line flow and extends the useful life of the electrode.

2. Description of Prior Art

Resistance welding electrodes are widely used in industry for spot welding steel, aluminum, copper, and various other metals. Some particular applications are the assembly of automobile bodies and truck bodies. In each of these uses, a robot weld gun fitted with a pair of electrodes is moved in stages along a continuous weld path. At each stage, the electrodes are contacted with opposite sides of the workpieces to be welded, and an electric current is passed through the electrodes and workpieces. Electrical resistance of the metals produces localized heating which causes the workpieces to fuse at a weld site. To prevent the electrodes from softening and melting, cooling water is continuously circulated through them at high pressure. When performed on a production line, these steps are each performed in rapid sequence and they are repeated at several different weld stations.

The electrodes are generally made from copper or copper alloys for low electrical resistivity and high current flow. The tips are also made from copper or copper alloys for high electrical conductivity. Frequently, the electrode tip sticks to the workpiece and dislodges the tip from the electrode. Also, repeated impact of the electrode tip to the workpiece loosens the contact tip from the electrode and can cause the electrode tip to dislodge. This common phenomenon causes the production line to shut down while the tips are manually reattached to the electrode.

There is no prior art that directly applies to the retention of the electrode contact tip on the electrode shank during resistance spot welding. Although some coatings have been developed in the prior art in order to prevent the workpiece metal and the electrode tip from sticking to each other. For example, Huys U.S. Pat. No. 4,861,961 discloses a welding electrode coated with titanium carbide. Engel U.S. Pat. No. 3,665,145 and Glagola U.S. Pat. No. 4,044,220 both disclose welding electrodes coated with nickel, beryllium, cobalt, iron, and alloys of such metals.

Lambert U.S. Pat. No. 2,431,334 claims a welding electrode comprising a tungsten rod coated with tungsten carbide. Anderson U.S. Pat. No. 5,066,845 discloses a welding electrode coated with tungsten disulfide. Although the above mentioned patents prevent workpiece metal from sticking to the electrode tip they do not prevent the tip from dislodging from the electrode itself.

Lajoie U.S. Pat. No. 5,726,420 discloses a taper lock contact tip for a welding device. The taper lock system has been designed specifically for metal inert gas welding equipment.

The above mentioned patent cannot be utilized for resistance spot welding due to three reasons. First, the threaded design compromises the structural integrity of the electrode and can cause fractures or breakage of the electrode due to the thinner walls and repeated impact during resistance spot welding. Second, because the inside of the electrode is continuously circulated with high pressure water as a cooling mechanism, the threaded taper lock can create an increased probability of water leakage. Third, the electrode tips are continuously changed throughout the day and repeated removal and attachment of electrode tips will cause premature wear of the threads which will shorten the useful life of the electrode.

OBJECTS AND ADVANTAGES

Several objects and advantages of the present invention are:

(a) to provide a contact tip locking mechanism which will retain the contact tip on the electrode shank.

(b) to provide a contact tip locking mechanism which will self lock through repeated resistance spot welding.

(c) to provide a contact tip locking mechanism which does not alter the low electrical resistivity and high current flow necessary for resistance spot welding.

(d) to provide a contact tip locking mechanism whose production allows for a convenient and economic change in the structure of the electrode and the contact tip.

(e) to provide a contact tip locking mechanism which can be easily attached.

(f) to provide a contact tip locking mechanism which can be easily removed.

DRAWING FIGURES

Figure 1:
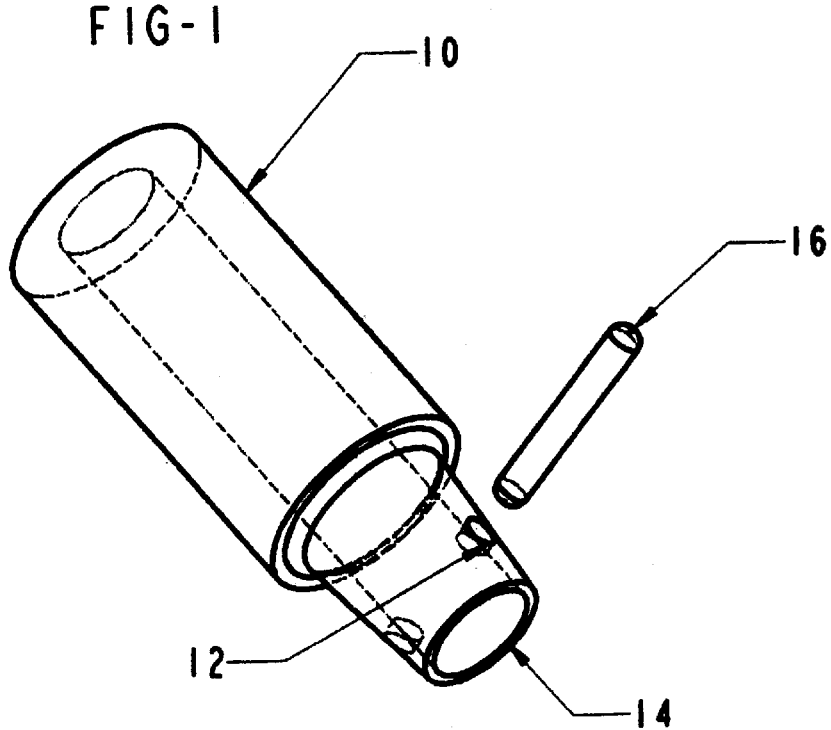
FIG. 1 shows the electrode shank with a hole parallel to the electrode top into which a metal pin is inserted.

REFERENCE NUMERALS IN DRAWINGS 10 electrode shank
14 top of electrode shank
18 electrode tip
22 groove
12 hole
16 metal pin
20 lead-in notch
24 hole

SUMMARY

In accordance with the present invention an electrode tip comprises two notches that lead into two diagonal grooves and end in a hole. A metal pin is inserted into electrode shank and protrudes from both sides of the electrode shank. The diagonal grooves in the electrode tip allow the tip to be anchored onto the metal pin the electrode shank serving to retain the electrode tip on the electrode shank.

DETAILED DESCRIPTION OF A PREFERRED EMBODIMENT

There is shown in FIG. 1 a preferred resistance welding electrode shank made in accordance with the present invention. The electrode shank 10 has a hole 12 which goes through the electrode shank 10 parallel to the top of the electrode shank 14 approximately 6 mm from the top of the electrode shank 14. The metal pin 16 inserted in hole 12.

The metal pin 16 should be manufactured from beryllium copper or beryllium nickel because both are high strength alloys that will not bend from the pressure of repeated impact during the resistance spot welding process. Furthemore, beryllium copper and beryllium nickel are both corrosion resistant alloys, which is necessary because the inside of the electrode shank 10 is continuously circulated with high pressure water as a cooling agent. Moreover, beryllium copper and beryllium nickel are high conductivity alloys that will not impair the low electrical resistivity and high current flow necessary for resistance spot welding.

Figure 2:
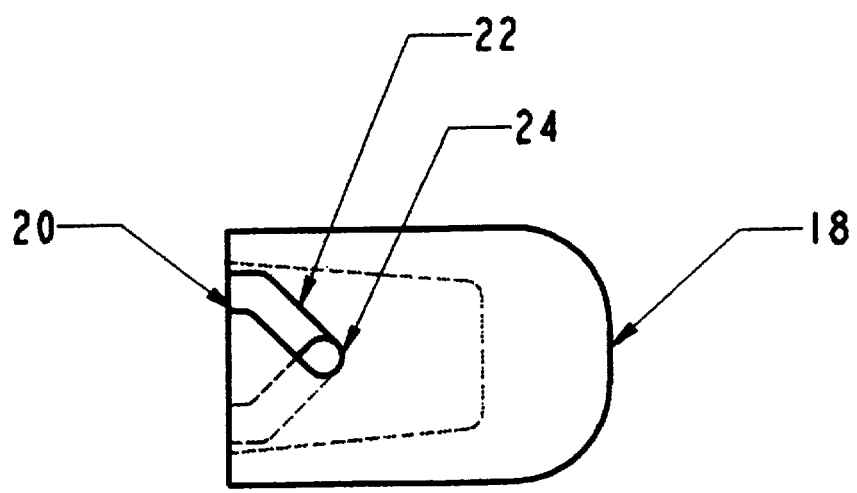
FIG. 2 shows the electrode contact tip with a diagonal groove on both sides of the contact tip.

FIG. 2 illustrates the modifications to the electrode contact tip in accordance with the present invention. The electrode contact tip 18 should be extended in length approximately 3 mm. On both sides of the electrode contact tip 18 are lead-in notches 20 which lead into diagonal grooves 22 that have an angle of approximately 45 degrees. Repeated impact of the electrode tip 18 will cause the metal pin 16 to be firmly seated in the hole 24, where the metal pin 16 will be securely anchored and locked into place.

Figure 3:
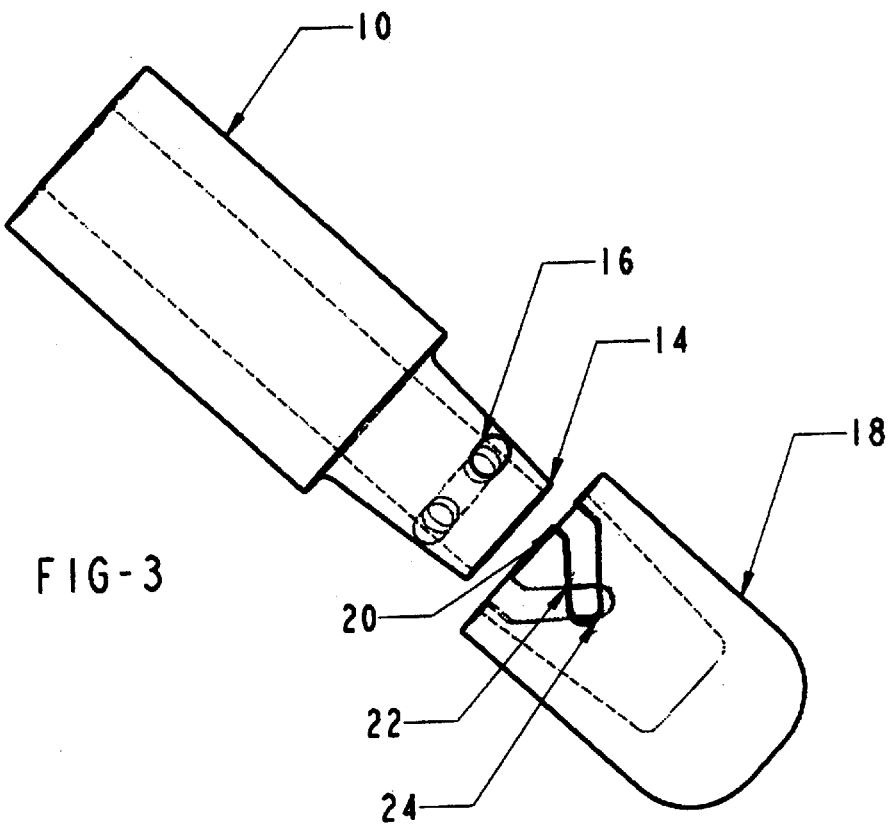
FIG. 3 shows the electrode shank with a metal pin inserted into place and the electrode contact tip with the diagonal grooves.

There is shown in FIG. 3 the electrode shank 10 with the metal pin 16 inserted into place, parallel to the top of the electrode shank 14. The electrode contact tip 18 has lead-in notches 20 on both sides of the electrode contact tip 18 that allow easy attachment of the electrode contact tip 18 onto the metal pin 16. The diagonal grooves 22 lead the metal pin 16 into the hole 24 where the metal pin 16 will be firmly seated.

Figure 4:
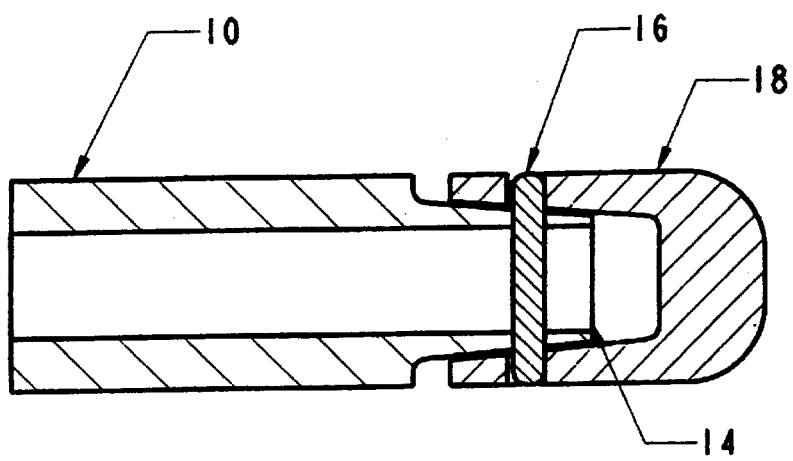
FIG. 4 shows the electrode contact tip locked onto the metal pin in the electrode shank.

FIG. 4 shows the electrode shank 10 into which the metal pin 16 has been inserted, parallel to the top of the electrode shank 14. The metal pin 16 protrudes from both sides of the electrode shank 10 slightly more than the width of the electrode contact tip 18. FIG. 4 further illustrates the electrode contact tip 18 locked onto the metal pin 16 in order to retain the electrode contact tip 18 on the electrode shank 10. This locking mechanism will prevent the electrode contact tip 18 becoming dislodged from the electrode shank 10 when the electrode contact tip 18 sticks to workpiece metal. Furthermore, this locking mechanism will prevent the electrode tip 18 from becoming dislodged from the electrode shank 10 as repeated impact of the electrode tip 18 on workpiece metal can by itself cause the electrode tip 18 to fall off the electrode shank 10.

SUMMARY, RAMIFICATIONS, AND SCOPE

Accordingly, the reader will see that the contact tip locking mechanism of this invention can be used to retain the contact tip easily and conveniently onto the electrode shank. This contact tip locking mechanism can be removed just as easily without damage to the electrode shank and can be reattached without difficulty. In addition, this contact tip locking mechanism will operate without impairing the ability of the electrode to maintain the characteristics of low electrical resistivity and high current flow necessary for resistance spot welding. Furthermore, the contact tip locking mechanism will not produce water leakage which can impede production line productivity. Moreover, the modifications of the electrode contact tip and the electrode shank can be manufactured with relative ease and with little economical change.

Although the present invention contains many specificities, these should not be construed as limiting the scope of the invention but as merely providing illustrations of the presently preferred embodiment of the invention. For example, the contact tip can be modified for 16mm, 19mm, or any other size necessary for resistance spot welding, the respective size of the electrode shank that corresponds to the contact tip can also easily be modified. Furthermore, the lead-in notches and diagonal grooves can be manufactured on the electrode shank itself, while the locking pin can be reduced in size and placed on opposing sides of the contact tip; essentially inverting the design of the preferred embodiment.

Thus the scope of the invention should be determined by the appended claims and their legal equivalents, rather than by the examples given.

I claim:

1. A resistance welding electrode comprising:
   (a) a hollow metal shank having a circular hole at one end perpendicular to its axis, such that a metal pin when inserted through extends on both sides of the said shank as a projected metal pin; and
   (b) a metal tip contaning two diagonal notches, which lead into two diagnol grooves and ends in a hole, which act as leads for the said protected metal pin and allows the metal tip to be guided and retained in position onto the metal shank, when the metal tip is slightly twisted over the said metal shank with the projected metal pin and thus when the said metal tip abuts against a metal workpiece, during welding, the said metal tip gets locked to the said shank by the projected metal pin.

2. The metal pin of claim 1 wherein the metal material is selected from the group consisting of beryllium copper, beryllium nickel, copper nickel, copper-nickel-zinc, nickel-molybdenum, nickel-molybdenum-chromium, titanium, or stainless steel.

3. The metal tip of claim 1 wherein said grooves are approximately 45 degrees as a means of retaining said tip onto the electrode shank.

* * * * *